(12) United States Patent
Samar et al.

(10) Patent No.: US 8,543,139 B2
(45) Date of Patent: Sep. 24, 2013

(54) DISTRIBUTED NETWORK

(75) Inventors: Prince Samar, Waltham, MA (US); Woojune Kim, Arlington, MA (US)

(73) Assignee: Airvana LLC, Chelmsford, MA (US)

( * ) Notice: Subject to any disclaimer, the term of this patent is extended or adjusted under 35 U.S.C. 154(b) by 971 days.

(21) Appl. No.: 11/833,740

(22) Filed: Aug. 3, 2007

(65) Prior Publication Data

US 2009/0034440 A1 Feb. 5, 2009

(51) Int. Cl.
*H04M 11/04* (2006.01)
*H04W 4/00* (2009.01)
*H04W 24/00* (2009.01)
*H04W 68/00* (2009.01)
*H04B 7/00* (2006.01)

(52) U.S. Cl.
USPC ............. 455/458; 455/404.2; 455/422.1; 455/426.1; 455/456.1; 455/515

(58) Field of Classification Search
USPC ........... 455/404.2, 422.1, 426.1, 456.1, 458, 455/515
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,286,507 B1* | 10/2007 | Oh et al. | 370/334 |
| 7,299,278 B2 | 11/2007 | Ch'ng | |
| 7,421,578 B1* | 9/2008 | Huang et al. | 713/163 |
| 7,558,356 B2 | 7/2009 | Pollman et al. | |
| 7,558,588 B2 | 7/2009 | To et al. | |
| 7,603,127 B2 | 10/2009 | Chung et al. | |
| 2002/0141420 A1* | 10/2002 | Sugiarto | 370/401 |
| 2002/0196749 A1 | 12/2002 | Eyuboglu et al. | |
| 2003/0100311 A1 | 5/2003 | Chung et al. | |
| 2004/0103278 A1* | 5/2004 | Abhishek et al. | 713/160 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0014550 A1* | 1/2006 | Ryu et al. | 455/458 |
| 2006/0025161 A1* | 2/2006 | Funato et al. | 455/458 |
| 2006/0041638 A1* | 2/2006 | Whittaker et al. | 709/219 |
| 2006/0044158 A1* | 3/2006 | Womble et al. | 340/870.02 |
| 2006/0045125 A1* | 3/2006 | Kim | 370/465 |
| 2006/0067422 A1 | 3/2006 | Chung | |
| 2006/0067451 A1 | 3/2006 | Pollman et al. | |
| 2006/0094431 A1* | 5/2006 | Saifullah et al. | 455/436 |
| 2006/0126509 A1 | 6/2006 | Abi-Nassif | |

(Continued)

FOREIGN PATENT DOCUMENTS

GB 2452688 3/2009

*Primary Examiner* — Patrick Edouard
*Assistant Examiner* — Matthew Genack
(74) *Attorney, Agent, or Firm* — Fish & Richardson P.C.

(57) ABSTRACT

Systems and methods for a distributed network are provided. In some embodiments, a method includes automatically transmitting a page message for a mobile station to access points in a paging group associated with a first access point, the page message having been received at the first access point, the first access point being associated with the most recent location update of the mobile station, and establishing a security agreement between the first access point and the other access points prior to receiving the page message.

46 Claims, 4 Drawing Sheets

(56) References Cited

U.S. PATENT DOCUMENTS

| | | |
|---|---|---|
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1* | 6/2008 | Valmikam et al. ............ 370/338 |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0194271 A1* | 8/2008 | Bedekar et al. ............ 455/456.2 |
| 2008/0207227 A1* | 8/2008 | Ren et al. ...................... 455/458 |
| 2008/0253550 A1 | 10/2008 | Ch'ng et al. |
| 2008/0254792 A1* | 10/2008 | Ch'ng ........................ 455/435.1 |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |

* cited by examiner

DISTRIBUTED NETWORK

BACKGROUND

This description relates to a distributed network.

Wireless communication networks are becoming a ubiquitous part of most people's daily lives. Early wireless networks were centralized networks that included a single controller that controlled multiple network nodes. More recent networks, however, employ a distributed architecture where a plurality of independent, but connected, nodes are spread across an area to provide access to the network. Each of these nodes acts as an access point into the network for those users near that particular node. Advantageously, this distributed architecture may lead to ease of deployment, lower costs and resilience to failures. However, managing the inter-node communication can be challenging—especially if the users themselves are mobile and often moving between the nodes.

SUMMARY

Advantages of particular implementations include one or more of the following.

In one aspect, there is provided, a method including automatically transmitting a page message for a mobile station to access points in a paging group associated with a first access point, the page message having been received at the first access point, the first access point being associated with the most recent location update of the mobile station; and establishing a security agreement between the first access point and the other access points prior to receiving the page message.

In another aspect, there is a method receiving a page message for a mobile station at a first access point, automatically transmitting the page message to access points that are geographically associated with the first access point and comprise fewer than all of the access points in a network to which the first access point belongs, the page message having been received at the first access point, the first access point being associated with the mobile station's most recent location update, paging the mobile station based on the page message, and performing a quick connect with the mobile station.

In yet another embodiment, there is a system having a target access point that is associated with the last received location update from a mobile station, wherein the target access point is configured to forward a page message to access points belonging to its paging group, when the target access point receives the page message from a source access point In still another aspect, there is provided a method including receiving a network access message from a mobile station, wherein the network access message contains mobile station's location information, determining identifiers for one or more access points associated with the network access message, and transmitting the determined identifiers to a source AP along with the location update.

In another embodiment, there is a method including receiving a network access message from a mobile station, forwarding the network access message to a source access point associated with the mobile station, initiating a security agreement process with one or more access points identified in the network access message, and handing off the security agreement process to the source access point.

In another aspect, there is provided a method involving receiving a network access message from a mobile station, transmitting the network access message to a source access point associated with the mobile station, and initiating a resource allocation process on one or more access points identified in the network access message before receiving a response from the source access point.

In yet a further embodiment, there is a method including receiving a network access message from a mobile station, transmitting the network access message to a source access point associated with the mobile station, and establishing a connection with the mobile station using one or more default connection parameters before receiving a response from the source access point.

In still another aspect, there is provided a method including receiving a network access message for a mobile station from a serving access point, transferring a subset of context and state information for setting up a connection with the mobile station to the serving. AP, wherein the subset of the context and state information enables the serving AP to perform a quick connection setup, and transferring: a remainder of the context and state information to the serving AP after the serving AP has established a connection with the mobile station.

Still other features, aspects, and advantages will become apparent from the description and the claims.

DESCRIPTION OF DRAWINGS

Like reference numerals in the various figures indicate like elements.

DETAILED DESCRIPTION

One of the primary advantages of wireless networks is the mobility that they offer to users. Cellular telephones are a primary example of this mobility. Millions of cellular telephone users worldwide are able to place and receive phone calls from virtually anywhere within large wireless networks, often covering cities, regions, or even entire countries. However, one of the challenges in supporting a large number of mobile users is locating a particular user within the network—especially if that user is mobile, for example, driving a car.

There are two general techniques that may be used to locate a particular user, also referred to as a mobile station ("MS"), within a wireless network. First, the network may broadcast a "page." This page typically identifies the particular MS and requests that that MS contact the network and provide its location. Second, the MS itself can initiate the location process by providing a location update to the network. For example, the MS may send a location update along with a request to access the network. Most wireless networks employ a combination of these techniques, with the MS periodically providing its location, and the network paging the MS if the network needs to contact the MS between location updates.

Efficient location and communication with the MS is particularly significant in distributed wireless networks. Distributed wireless networks employ a plurality of independent, yet connected nodes, referred to as access points ("APs"), that are distributed throughout the wireless network's region. Although a particular MS might 15; have entered the network at one AP, because the MS is mobile, there is no guarantee that the MS will remain within range of that entry node. If the MS has done a recent location update, that update may provide some indication of the MS's location, but the accuracy of that location update is dependent upon the amount of time passed since the location update-especially if the MS is moving. For example, if the MS is located within a vehicle, a few minutes after a location update, the MS may be several miles away from where it sent out the location update.

One possible technique for locating the MS is to have all of the nodes within the wireless network page the MS. Although this type of mass paging is effective, it may be an inefficient use of the network's transmission resources. One or more of the embodiments set forth below provide techniques for paging and or establishing connections with mobile stations in a distributed wireless network.

Figure 1:
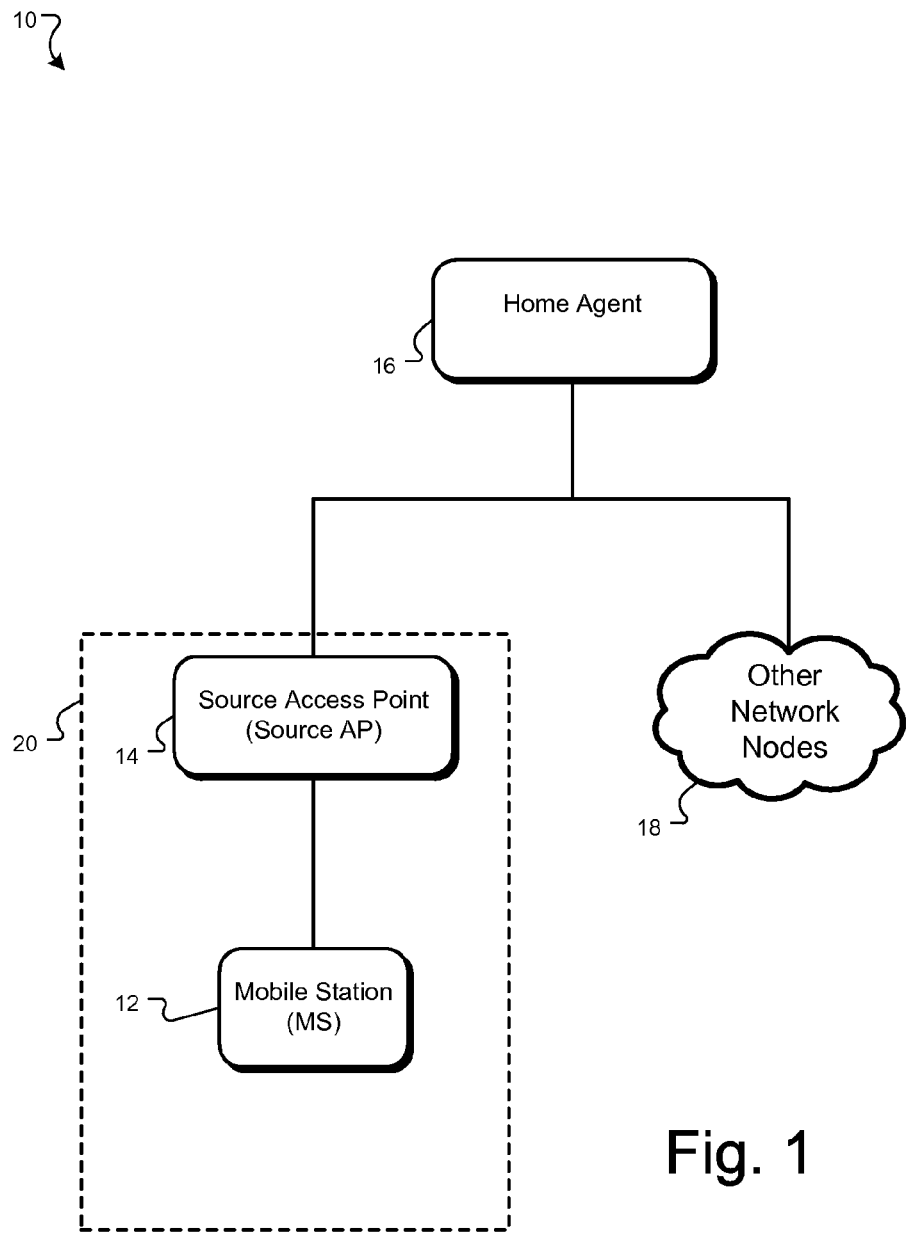
FIG. 1 is a block diagram of an exemplary distributed network.

Referring first to FIG. 1, an exemplary distributed network 10 includes a mobile station ("MS") 12, a source access point ("source AP") 14, a home agent 16, and other network nodes 18. The MS 12 may include any suitable form of cellular or wireless device. For example, in many configurations, the MS 12 will be a cellular or wireless telephone or other wireless computerized device, such as a personal digital assistant ("PDA") or laptop computer. However, these exemplary MSs 12 are not intended to be exclusive, and, in other configurations other suitable wireless devices may be employed.

As shown in FIG. 1, the MS 12 communicates with the source AP 14, which is a node of the network 10. Like the other network nodes 18 that may be part of the network 10, the source AP provides a gateway for the MS 12 to wirelessly access network resources. In various configurations, the source AP 14 may include one or more antennae, one or more radio devices, such as radio transceivers, and one or more control systems, such as computers. In at least one configuration, the source AP 14 includes a Base Station Router that may comprise antennae, radios, modems, controller, and gateway functionalities (e.g., RN, RNC and PDSN functionalities all in a single BSR access point).

In operation, the source AP 14 stores MS specific communication preferences for the MS 12 and maintains the most recent location information for the MS 12. If another node or resource on the network 10 or outside the network (e.g., connected to the network 10 via the internet or phone line) wishes to communicate with the MS 12, that node or resource would contact the source AP 14 directly or indirectly to setup a communication channel with the MS 12. In other words, the source AP 14 acts as the source within the network 10 for any communication with the MS. Regardless of which AP's service area the MS 12 is within, the source AP 14 will be contacted first to provide the appropriate MS specific information.

Figure 2:
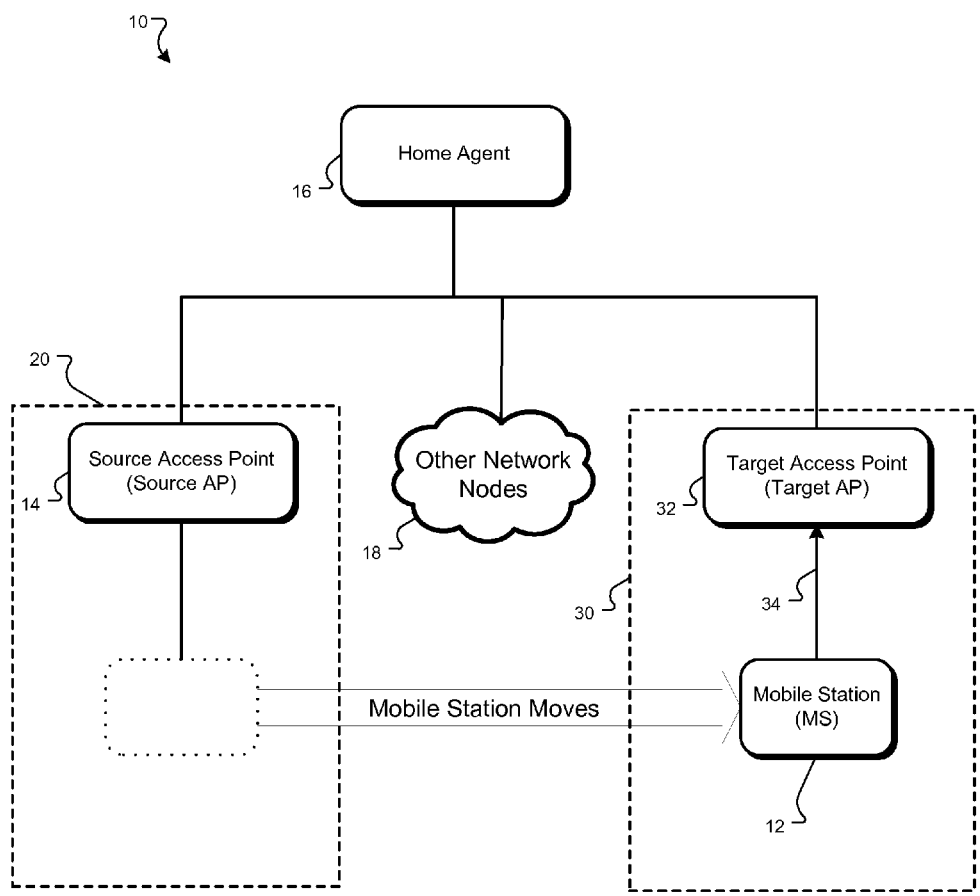
FIG. 2 is another block diagram of an exemplary distributed network.
Figure 3:
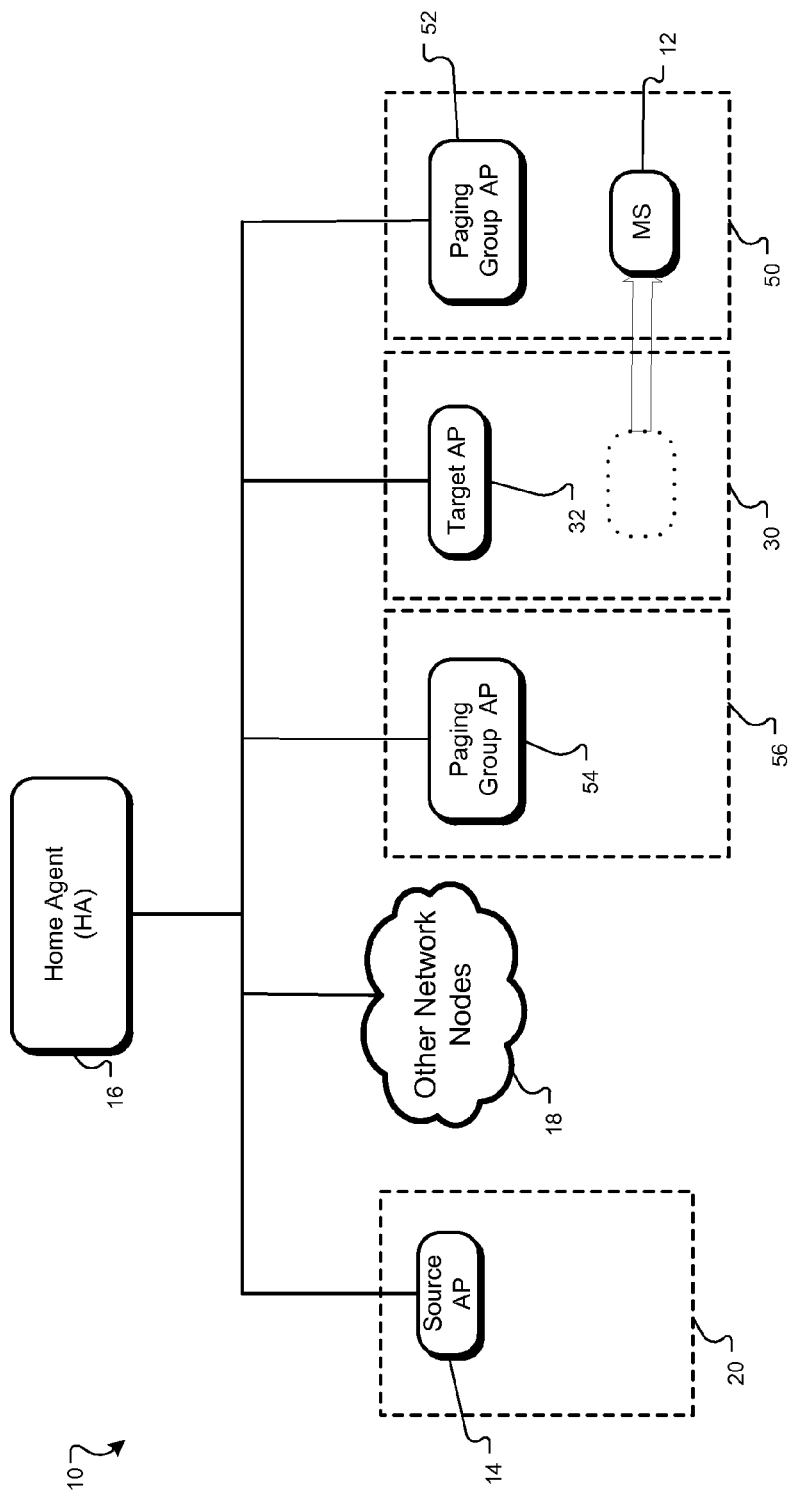
FIG. 3 is another block diagram of an exemplary distributed network.

For example, if the home agent 16 receives an email for the MS 12, the home agent would contact the source AP 14 to locate the MS 12 and determine the MS's communication preferences. If the MS 12 is still within a service area 20 of the source AP 14 (as shown in FIG. 1), the source AP 14 itself would use the MS's communication preferences to communicate with the MS 12. However, if the MS 12 is outside the source AP's service area 20 (as shown in FIGS. 2 and 3), the source AP 14 would employ the location information and communication preferences and context for the MS 12 to facilitate establishing a connection to the MS 12 through another AP, as described further below with regard to FIGS. 2-4.

In one embodiment, the communication preferences and context for the MS may include session information, accounting information, security information, addressing information, and/or policy information for the MS 12. This session information may include any one of a number of suitable connection related variables including, but not limited to, modulation information, coding information, quality of service ("QoS") information, grade of service ("GoS") information, channel related information, and other user preference information.

In addition to maintaining the MS specific communication preferences and context, the source AP 14 also maintains the most recent location update for the MS 12. As such, location information provided by the MS 12, whether it is transmitted in response to a page, or it is transmitted as part of a MS initiated location update, is transmitted to and stored on source AP 14. When another device or service on the network 10 or outside the network 10 needs to contact the MS 12, that device or service first contacts the source AP 14. If the last location update for the MS 12 was within the source AP's service area 20, the source AP would then initiate a page for the MS 12. If, on the other hand, the MS's last location update was in another AP's service area, the source AP 14 would transmit the paging information to that AP, as described in further detail below with regard to FIGS. 2-4.

The MS/source. AP relationship is not fixed, and the MS 12 can adopt or be assigned a new source AP 14 for a variety of reasons. Typically, the first AP that the MS 12 accesses upon entering a network (e.g., when the cellular telephone is turned on or is brought into the service area) will be assigned as the source AP 14 for the MS 12. However, the MS's source AP 14 may change as the MS 12 moves through the network 10. For example, the source AP 14 may switch to a different AP if the MS 12 moves a threshold distance away from the source AP. The duties of the source AP 14 may also be transferred to a different AP to increase performance or decrease connection setup time between the MS 12 and network. For example, if the MS 12 stays within a particular AP's service area for a given amount of time, that AP may become the source AP for the MS 12. When a new AP assumes source AP responsibilities for the MS 12, the MS's communication preferences and context may be transferred from the former source AP 14 or may be transmitted anew by the MS 12.

The home agent 16 functions as a central anchor point or central server for the network 10. "Home agent" is a generic term that abstracts the rest of the network 10 to the outside world, providing a single point of contact for any user in the network 10. When an entity outside the network wants to send a message to the MS 12, that entity relays the message to the source AP 14 associated with the MS 12 through the home agent 16. In order to accomplish this, the home agent 16 maintains a listing of the source AP associated with each MS 12 in the network 10. The home agent 16 may receive the association from an AP when that AP assumes source AP responsibilities. In some embodiments, the home agent 16 includes the internet point of presence for the network 10.

The source AP 14 may be communicatively coupled to the home agent 16 via any one of a number of suitable wireless or hard-wired communication channels or backhauls. In various configurations, these communication channels may include Ethernet or fiber optic lines, microwave transmissions, the internet, and so forth.

FIG. 2 illustrates the distributed network 10 after the mobile station 12 leaves the service area 20 of the source AP 14 and enters a service area 30 of a target AP 32. The target AP 32 is the most recent AP that the MS 12 has sent a location update 34. Upon leaving the service area 20, the MS 12 may pass through service areas for a variety of other AP; however, an AP is only designated to be the target AP 32 if the MS 12, transmits the location update 34 to that AP or if the MS 12 answers a page from that AP. Due to the periodic nature of location updates and/or paging, the target AP 32 for the MS 12 may change often.

When the target AP 32 receives a location update 34, the target AP 32 transmits the location update 34 to source AP 14. The source AP 14 then stores the identity of the target AP 32 as the most recent location of the MS 12. As will be described in greater detail below, in some embodiments, the target AP 32 transmits the identity of the target AP 32 and the identity of one or more other access points associated with the target AP 32. If the MS 12 subsequently sends a location update to another AP, the process is repeated and the source AP 14 updates the identity of the target AP 32.

If the home agent 16 wants to page the MS 12 while the MS 12 is within the service area 30 of the target AP 32, the home agent 16 transmits the page message to the source AP 14. The source AP 14 identifies which AP is the target AP 32 and transmits the page message to the target AP 32. The target AP 32 would then transmit the page message to the MS 12.

This above-described technique, however, only works well if the MS 12 is still within the service area 30. If the MS 12 has left the service area 30, the MS 12 will probably not receive a page transmitted by the target AP 32. This case is illustrated in FIG. 3, which shows another block diagram of the network 10 in which the MS 12 has moved out of the service area 30 and into a service area 50 of another AP, labeled in FIG. 3 as paging group AP 52. As described further below, the paging group AP 52 may be an AP that neighbors the target AP 32. In this case, the MS 12 has left the service area 30, but it has not yet sent a location update to the paging group AP 52. Accordingly, the most recent location information available to the source AP 14 is that the MS 12 is located within the service area 30. However, a page message sent tithe target AP 32 would most likely not be answered by the MS 12, because the MS 12 has left the service area 30.

Figure 4:
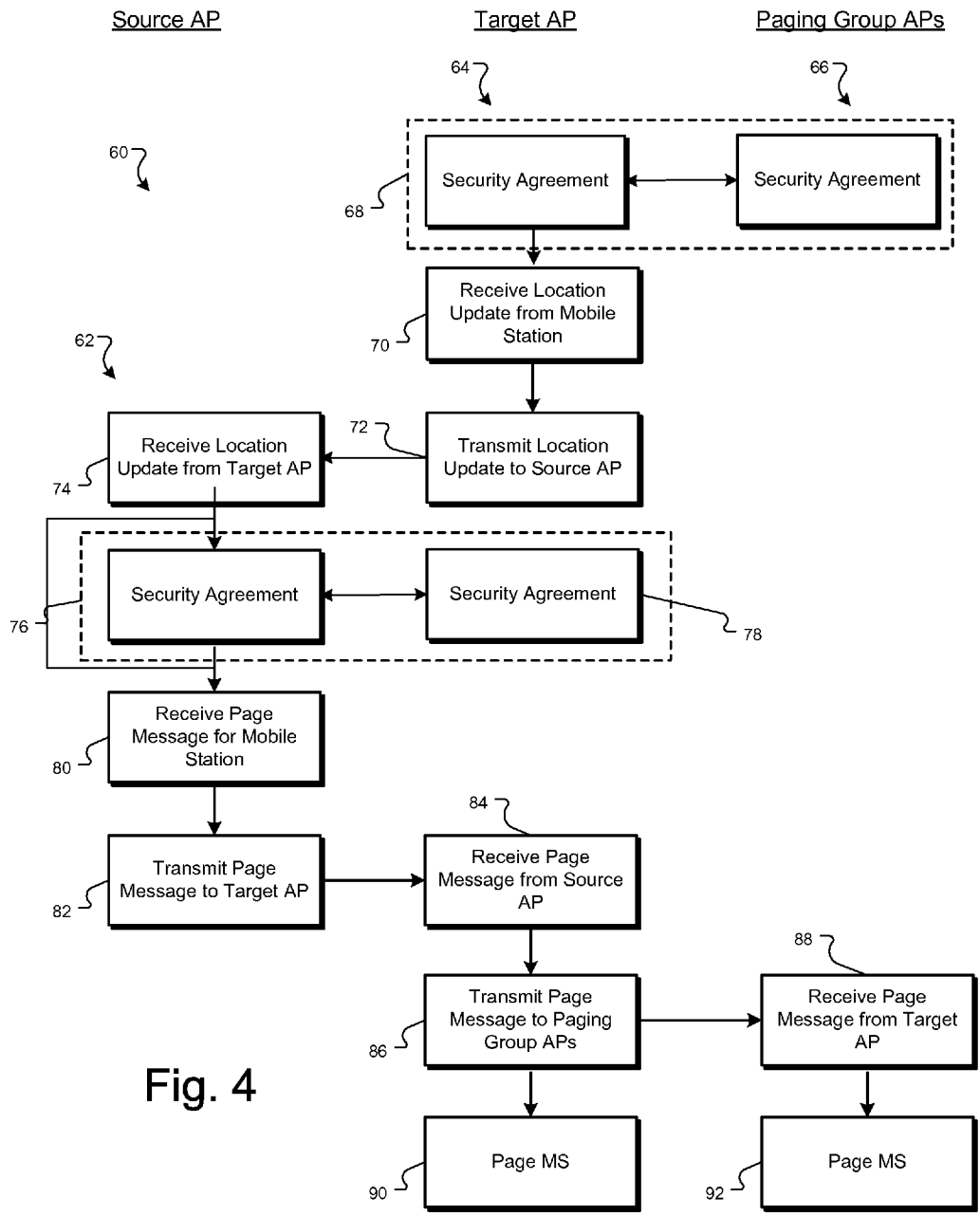
FIG. 4 is a flow chart.

FIG. 4 is a flow chart illustrating an exemplary technique 60 that may be employed by the network 10 to efficiently page the MS 12 regardless of whether it is located in the service area 30 or has moved into the service area 50 of the paging group AP 52. Moreover, if desired, the technique 60 also facilitates the efficient establishment of security agreements between the APs involved in paging the MS 12. As illustrated, the technique 60 may be subdivided into three sub-techniques 62, 64, and 66, which are each appropriate for execution by the source AP 14, the target AP 32, and the paging group. AP 52, 54, respectively. For example, the sub-technique 64 may be executed by a computer located within the target AP 32.

As indicated by blocks 68, the technique 60 may optionally begin with the target AP 32 establishing a security agreement with AP 52 and 54 in its paging group (see FIG. 3). The paging group of a particular target AP 32 includes the group of APs that may be paged if the AP's last known location was the target AP 32. In one configuration, the paging group is set by the operator of the network 10. The paging group may include the APs within a particular distance from the target AP 32. For example, the APs in the paging group may auto-configured using information from some map servers. Exemplary techniques for establishing a paging group are set forth in co-assigned, pending U.S. patent application Ser. No. 11/642,245, filed on Dec. 20, 2006, which is hereby incorporated by reference.

Because the relationship between the target AP 32 and the paging group APs 52 and 54 is pre-established, the target AP 32 and the paging group APs 52 and 54 may establish a security agreement between each other at any suitable time before the page message is sent for the MS 12. This pre-establishment may decrease the latency involved in paging the MS 12 and subsequently setting up a connection between the network 10 and the MS 12. This is the case because the paging of the MS 12 will not have to wait on a security agreement to be established between the target AP 32 and the paging group APs 52 and 54. In practice, each of the APs within the network 10 may have pre-established security arrangements with those APs that are located in its paging group.

For example, each of the APs may establish security agreements with those APs that border it or overlap with its service area. In other configurations, the APs may maintain security agreements with any other AP located within a certain distance from that AP. In still other embodiments, other suitable criteria like assistance from map servers may be used to determine which APs maintain security agreements with one another. In this way, when one of the APs becomes a target AP 32, that new target AP will already have security agreements in place with the APs in its paging group.

The security agreement between the target AP 32 and the paging group APs 52 and 54 enable the target AP 32 and the paging group APs 52 and 54 to securely communicate between one another. Any suitable type of security agreement may be employed to manage this connection, including, but not limited to the use of PKI certificates, IPSec SA information, or other suitable forms of encryption or security.

Although the establishment of security agreements between the target AP 32 and the paging group APs 52 and 54 is shown as occurring before the other blocks of the technique 60. This act may also be performed at other suitable time during the technique 60 (after a location update is received, for example). Further, in some other configurations, the target AP 32 may not maintain a security agreement with the paging group APs 52 and 54 at all. In these configurations, communications between the APs may be unsecured and blocks 68 may be omitted.

The technique 60 also includes receiving allocation update from the MS 12, as indicated by block 70. After receiving the location update from the mobile station, the target AP 32 will transmit the location update to the source AP 14 associated with the mobile station, as indicated by block 72. The source AP 14 will receive the location update from the target AP, as indicated by block 74.

After receiving the location update, the source AP 14 may store the location update as well as location and identity information for the target AP 32. In addition, the source AP 14 and the target AP 32 may optionally initiate a security agreement between them in response to receiving the location update, as indicated by blocks 76 and 78. As with the security agreement between the target AP 32 and the paging group APs 52 and 54, the security agreement between the source AP 14 and the target AP 32 can employ any suitable security standard, such as a PKI certificate, or IPSec SA authentication. By establishing the security agreement in response to the location update and before a page message is received for the MS 12, the source AP 14 will not have to establish a security agreement with the target AP 32 when the page message is received. This pre-established security can advantageously reduce the amount of time needed to page the MS 12.

At some point following the establishment of the security agreement, the source AP 14 receives a page indication for the MS 12 as a result of a message from the home agent 16 or another source for the MS 12, as indicated by block 80. After receiving the page indication, the source AP 14 may generate and transmit a page message for the MS 12 to the target AP 32, as indicated by 82. If a security agreement was in place between the source AP 14 and the target. AP 32, the page message will be transmitted using the security agreement.

Next, the target AP 32 will receive the page message, as indicated by block 84. However, as described above, in the intervening time between when the target AP 32 received the location update from the MS 12 and when the target AP 32 received the page message from the source AP 14, the MS 12 may have left the target AP's service area 30, such as is illustrated in FIG. 3. In this case, transmitting the page message only into the service area 30 would probably not locate MS 12. For this reason, the technique 60 also includes forwarding the page message to all the paging group members (APs 52 and 54) of the target AP 32. Because the paging group APs 52 and 54 are associated with the target AP 32 (e.g., located in the geographical areas around the target AP 32), it is likely that transmitting the page message in both the service area 30 and the service areas 50 and 56 of the paging group APs 52 and 54 will be successful in locating the MS 12. As such, in blocks 86 and 88 of the technique 60, the target AP 32 transmits the page message to the paging group APs 52 and 54.

Lastly, the technique 60 may include the target AP 32 and the paging group APs 52 and 54 paging the MS 12, as indicated by blocks 90 and 92. Advantageously, the technique 60 results in the MS 12 being paged in both the target AP's service area 30 and the service areas 50 and 56 of the paging group APs 50 and 56 without the source AP 14 having to directly communicate or, in fact, even know the identities of the paging group APs 52 and 54. Further, because the source AP does not communicate directly with the paging group APs, there is no need to establish security agreements between the source AP 14 and the paging group AP 52 and 54, making the paging process more efficient. However, because there are security agreements (if security is desired) between the source AP 14 and the target AP 32 and between the target AP 32 and the paging group APs 52 and 54, the page message is always secure on its journey between the source AP 14 and the paging group APs 52 and 54. Further, in some embodiments, all these security agreements are performed before the MS 12 is paged also reducing the paging time and the subsequent connection setup time.

Once the MS 12 has been paged and has answered the page message, the network 10 may establish an airlink connection with the MS 12 to communicate with the MS 12. Alternately, the MS 12 may also choose to initiate a connection setup on its own, by sending a connection request message to the network 10, when, for example, the MS 12 wishes to place a call, access the Internet, and the like. The response to the page message or the MS's unsolicited connection request, both of which are collectively referred to as network access message are received at a particular AP, which is referred to as a "serving AP." The "serving. AP" may be the Target AP itself, or a member of its paging group.

Because the session context and/or communication preferences for the MS 12 are stored on the source AP 14, and the network access message is received at the serving. AP (any AP in the network), the source AP and the serving AP may work together to setup a connection for the MS 12. This happens because distributed networks do not have a central controller to coordinate this activity. As at least two network nodes are involved and work together, there may be a delay involved in setting up the connection, as compared to centralized networks. This setup delay can reduce the efficiency and performance of the network 10. To reduce this setup delay, the network 10 may employ one or more techniques described below to speed up establishing a connection with the MS 12. Each of these techniques may be employed on their own or in combination with each other.

In some configurations, the serving AP (paging group AP 52, for example) that received the response to the page message from the MS 12 or received the unsolicited connection request message from the MS 12, sends the network access message to the source AP 14. The source AP 14 then initiates a connection setup for the MS 12 by requesting resources at the serving APs that will be used by the MS 12. These resource requests may be directed toward the serving AP and optionally toward a subset of the APs neighboring the serving AP, belonging to its "neighbor group". The "neighbor group" for a particular AP X is defined as the set of APs within immediate proximity of the AP X such that the MS may be able to get into the coverage of any of the members of the neighbor group directly from the coverage of AP X without any break in service. Exemplary techniques for establishing a neighbor group are set forth in co-assigned, pending U.S. patent application Ser. No. 11/642,245, filed on Dec. 20, 2006. In some embodiments, the paging group includes the neighbor group APs described above.

For example, if the network 10 supports soft handoffs between APs (e.g., a CDMA network), resource requests may be transmitted to every AP within range of the MS 12, as indicated by the MS 12 or inferred by the network 10. These APs would belong to the neighbor group of the serving AP. The identity of those APs within range of the MS 12 may be transmitted to the source AP 14 along with the location update. Once the resources are allocated, the source AP 14 can complete the connection setup by sending information to the MS 12 (via the serving AP) indicating the allocated resources that the MS 12 may use to setup the connection. In this embodiment, the source AP 14 maintains control of the connection.

In some configurations, each of the APs in the network maintains the information that may be needed to set up a connection for each of the members of its neighbor group, along with security associations with each of them. Now when the source AP needs this information to setup a connection for the MS, the serving AP can provide information about any of the members of its neighbor group, including itself, to the source AP. When the MS 12 sends a network access message either in response to a page or unsolicited, the serving AP can automatically transmit the setup information for itself and any (one or more or none) of the APs in its neighbor group to the source AP 14 along with the network access message.

For example, the serving AP may process the location update message and/or the network access message locally to determine the APs reported by the MS 12 in the message. This processing of the location update message or the network access message may involve determining the IP addresses and other information for the APs whose identifiers the MS 12 has reported in the message. These identifiers will typically include APs that are geographically related to the serving AP (e.g., one or more Aps from the serving AP's neighbor group). In one implementation, the identifiers reported by the MS 12 may be the PN offsets or PN phases corresponding to the APs whose signals the MS 12 can detect with acceptable quality. The MS 12 may request these APs to be included in as part of the connection (e.g., as a member of the 'Active Set' in supporting technologies). Further, the serving AP may find out the connection parameters, such as their available resources, for each of the APs requested by the MS 12 and may request resource allocation for these APs. The serving AP may do all this locally, without having to wait for the source AP to perform this, thus speeding up the connection setup.

Advantageously, receiving the setup information or other parameters for the serving AP and one or more of the neighbor group APs, as needed, along with the network access message may allow the source AP to initiate a connection for the MS 12 through the serving AP and its neighbor group APs without having to take the time to request this setup information directly from the serving AP and its neighbor group APs. This can result in a quicker connection to the MS 12 through the serving AP and those neighbor group APs that are requested by the MS 12 to be a part of the airlink connection.

In another configuration, the serving AP may be configured to initiate the process of establishing a security agreement between the APs in its neighbor group and the source AP 14. As the neighbor group is known apriori, the security association between the serving AP and the members of its neighbor group can be established well before the network access message is received from an MS. The serving AP may establish the security association with the source AP while it coordinates the connection setup with the APs in the neighbor group. The serving AP may also be configured to transmit instructions to those APs in its neighbor group that are either requested by the MS 12 or determined by the network for inclusion in the connection (as described above). For example, the serving AP may tell the neighbor group APs to reserve the resources needed by the MS 12.

The serving AP may also initiate resource allocation without waiting for instruction from the source AP. In some embodiments, the serving AP receives information about the MS's resource requirements after the serving AP sends the network access message or the location update message to the source AP 14. For example, after sending a location update to the source AP 14, the source AP 14 may reciprocate by sending some MS specific preference information to the serving AP. The serving AP can then transmit this information to the neighbor group APs to speed up the connection setup between itself, the neighbor group APs, the source AP and the MS 12.

The serving AP, that received the network access message from the MS 12, may also be configured to establish a quick connection or ad-hoc connection with the MS 12 while that AP awaits the MS specific preference and context information to be transmitted from the source AP 14. This quick connection may be established using default parameters to enable some data transmission to the MS 12 to begin. For example, until the serving AP receives the MS's context information from the source AP 14, it may establish a connection using a slower, nominal data rate. In this way, the serving AP may be able to advantageously speed up the establishment of a connection for the MS 12. Even though this connection may not perfectly match the MS's preferences at first, a connection can be established quicker to the MS 12. Once all the context information is received from the source AP, the connection can be tuned to the particular context and preferences that the MS 12 initially negotiated with the source AP 14. This quick connect performed by the serving AP may involve an airlink connection setup through only itself, or it may involve the setting up of the airlink connection including any of its neighbor group members as well.

The network 10 may also be configured to initiate a transfer of source AP responsibilities after MS 12 transmits the network access message. In one configuration, source AP responsibilities may be transferred from the source AP 14 to the serving AP (or any other one of the neighbor group APs requested by the MS) before a connection is established with the MS 12. In another configuration, source AP responsibilities may be transferred after the connection with the MS 12 has been established using an inter AP active session transfer. In yet another configuration, using staged session transfer, the source AP may transfer the more important information, such as context and state information that is mandatory for setting up the connection, to the serving AP first to enable a quick connection setup. Once the mandatory information is received, the serving AP can initiate a connection setup for the MS 12. The rest of the context and state information, which is not mandatory for setting up the airlink connection, can then be transferred after the connection setup as a subsequent stage. This configuration may enable lesser delays to be incurred in setting up the connection by transferring source AP responsibilities to an AP closer to the MS 12 in a staged manner. This transfer of the source AP responsibilities may improve the quality or efficiency of the MS's connection and reduce the backhaul traffic and delays, once the connection opens up.

The techniques described herein, such as the technique 60 and the techniques for speeding up connection setup, for example, can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of; data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

It will be seen by those skilled in the art that many embodiments taking a variety of specific forms and reflecting changes, substitutions, and alternations can be made without departing from the spirit and scope of the invention. Therefore, the described embodiments illustrate but do not restrict the scope of the claims.

What is claimed is:

1. A method performed by a first access point, comprising:
    prior to receiving a page message:
        establishing a first security agreement for secure communication between the first access point and one or more second access points;
        establishing a second security agreement for secure communication between the first access point and a source access point; and
        establishing, through the first access point by the first security agreement and the second security agreement, one or more secure communication channels between the source access point and the one or more second access points, wherein establishment of the one or more secure communication channels prior to receipt of the page message decreases a latency associated with paging the mobile station relative to a latency associated with paging the mobile station independent of prior establishment of the one or more secure communication channels;
    receiving, from the source access point over the one or more secure communication channels, the page message for a mobile station in a service area of the one or more second access points; and
    transmitting, by the first access point over the one or more secure communication channels established between the source access point and the one or more second access points, the page message, received from the source access point, to the one or more second access points for paging the mobile station.

2. The method of claim 1, wherein the one or more second access points are geographically associated with the first point.

3. The method of claim 1, wherein establishing the first security agreement comprises establishing an IPSec SA agreement.

4. . The method of claim 1, wherein the first security agreement comprises a PKI certificate 5. The method of claim 1, further comprising:
    identifying the one or more second access points prior to receiving the page message.

6. The method of claim 1, wherein the service area of the one or more second access points at least partially borders or overlaps with a service area of the first access point.

7. The method of claim 1, wherein the one or more second access points are located within a threshold distance of the first access point.

8. The method of claim 1, wherein an identity of the one or more second access points is determined by a map server.

9. The method of claim 1, further comprising receiving the page message at the first access point.

10. The method of claim 1, wherein the source access point is configured to store a location for the mobile station.

11. The method of claim 1, wherein the second security agreement is established between the first access point and the source access point prior to an arrival of the page message at the source access point.

12. The method of claim 1, further comprising receiving mobile station communication preferences from the source access point.

13. The method of claim 1, further comprising performing a quick connect with the mobile station.

14. The method of claim 1, further comprising:
    causing, based on the page message, the mobile station to be paged.

15. The method of claim 13, wherein performing the quick connect comprises establishing an ad-hoc connection with the mobile station using one or more default communication preferences.

16. A system comprising:
    one or more processing devices; and
    one or more machine-readable media storing instructions that are executable by the one or more processing devices to perform, in a first access point, operations comprising:
        prior to receiving a page message:
            establishing a first security agreement for secure communication between the first access point and one or more second access points;
            establishing a second security agreement for secure communication between the first access point and a source access point; and
        establishing, through the first access point by the first security agreement and the second security agreement, one or more secure communication channels between the source access point and the one or more second access points, wherein establishment of the one or more secure communication channels prior to receipt of the page message decreases a latency associated with paging the mobile station relative to a latency associated with paging the mobile station independent of prior establishment of the one or more secure communication channels;
        receiving, from the source access point over the one or more secure communication channels, the page message for a mobile station in a service area of the one or more second access points; and
        transmitting, by the first access point over the one or more secure communication channels established between the source access point and the one or more second access points, the page message, received from the source access point, to the one or more second access points for paging the mobile station.

17. The system of claim 16, wherein the operations further comprise:
causing, based on the page message, the mobile station to be paged.

18. The system of claim 17, wherein the one or more second access points are geographically associated with the first access point.

19. The system of claim 17, wherein the service area of the one or more second access points at least partially borders or overlaps with a service area of the first access point.

20. The system of claim 19, wherein the first security agreement is established before the first access point receives the page message.

21. The method of claim 1, further comprising:
receiving a network access message from the mobile station, wherein the network access message comprises location information of the mobile station;
determining identifiers for one or more third access points associated with the network access message; and
transmitting the identifiers to the source access point.

22. The method of claim 21, wherein receiving the network access message comprises receiving a response to a page message.

23. The method of claim 21, wherein receiving the network access message comprises receiving a request by the mobile station to access the network.

24. The method of claim 21, wherein determining the identifiers comprises determining an IP address from a PN offset.

25. The method of claim 21, wherein determining the identifiers comprises determining an IP address from a PN phase.

26. The method of claim 21, wherein determining the identifiers comprises:
reading the identifiers from the network access message; and
mapping the identifiers for use in connection setup, wherein the identifiers correspond to the one or more second access points 27. The method of claim 21, wherein determining the identifiers comprises determining identifiers that may be used to form an active set for the mobile station.

28. The method of claim 1, further comprising:
receiving a network access message from a mobile station;
forwarding the network access message to a source access point;
initiating a security agreement process with one or more third access points identified In the network access message; and
handing off the security agreement process to the source access point.

29. The method of claim 28 wherein the network access message comprises a response to a page message.

30. The method of claim 1, further comprising:
receiving a network access message from a mobile station;
transmitting the network access message to the source access point; and
initiating a resource allocation process on one or more third access points identified in the network access message before receiving a response from the source access point.

31. The method of claim 30, wherein initiating the resource allocation process comprises:
determining an IP address for at least one of the one or more third access points from a PN offset reported by the mobile station; and
initiating messaging with the at least one of the one or more third access points to allocate resources for connection setup.

32. One or more non-transitory machine-readable media storing instructions that are executable by one or more processing devices to perform, in a first access point, operations comprising:
prior to receiving a page message:
establishing a first security agreement for secure communication between the first access point and one or more second access points;
establishing a second security agreement for secure communication between the first access point and a source access point; and
establishing, through the first access point by the first security agreement and the second security agreement, one or more secure communication channels between the source access point and the one or more second access points, wherein establishment of the one or more secure communication channels prior to receipt of the page message decreases a latency associated with paging the mobile station relative to a latency associated with paging the mobile station independent of prior establishment of the one or more secure communication channels;
receiving, from the source access point over the one or more secure communication channels, the page message for a mobile station in a service area of the one or more second access points; and
transmitting, by the first access point over the one or more secure communication channels established between the source access point and the one or more second access points, the page message, received from the source access point, to the one or more second access points for paging the mobile station.

33. The one or more non-transitory machine-readable media of claim 32, wherein the service area of the one or more second access points at least partially borders or overlaps with a service area of the first access point.

34. The one or more non-transitory machine-readable media of claim 32, wherein the one or more second access points are geographically associated with the first access point.

35. The one or more non-transitory machine-readable media of claim 32, wherein establishing the first security agreement comprises establishing an IPSec SA agreement.

36. The one or more non-transitory machine-readable media of claim 32, wherein the first security agreement comprises a PKI certificate.

37. The one or more non-transitory machine-readable media of claim 32, wherein the operations further comprise:
identifying the one or more second access points prior to receiving the page message.

38. The one or more non-transitory machine-readable media of claim 32, wherein the one or more second access points are located within a threshold distance of the first access point.

39. The one or more non-transitory machine-readable media of claim 32, wherein an identity of the one or more second access points is determined by a map server.

40. The one or more non-transitory machine-readable media of claim 32, wherein the operations further comprise receiving the page message at the first access point.

41. The one or more non-transitory machine-readable media of claim 32, wherein the source access point is configured to store a location of the mobile station.

42. The one or more non-transitory machine-readable media of claim 32, wherein the second security agreement is established between the first access point and the source access point prior to an arrival of the page message at the source access point.

43. The one or more non-transitory machine-readable media of claim 32, wherein the operations further comprise receiving mobile station communication preferences from the source access point.

44. The one or more non-transitory machine-readable media of claim 32, wherein the operations further comprise performing a quick connect with the mobile station.

45. The one or more non-transitory machine-readable media of claim 32, wherein the operations further comprise causing, based on the page message, the mobile station to be paged.

46. The one or more non-transitory machine-readable media of claim 44, wherein performing the quick connect comprises establishing an ad-hoc connection with the mobile station using one or more default communication preferences.

* * * * *

UNITED STATES PATENT AND TRADEMARK OFFICE
CERTIFICATE OF CORRECTION

PATENT NO. : 8,543,139 B2  
APPLICATION NO. : 11/833740  
DATED : September 24, 2013  
INVENTOR(S) : Prince Samar Page 1 of 1

It is certified that error appears in the above-identified patent and that said Letters Patent is hereby corrected as shown below:

In the Claims

Column 11, Line 63, Claim 2, after "first" insert -- access --.

Column 12, Line 1, Claim 4, delete ".The" and insert -- The --, therefor.

Column 12, Line 17, Claim 10, delete "for" and insert -- of --, therefor.

Column 13, Line 22, Claim 22, delete "a page" and insert -- the page --, therefor.

Column 13, Line 26, Claim 23, delete "the network" and insert -- a network. --, therefor.

Signed and Sealed this  
Eighteenth Day of February, 2014

Michelle K. Lee  
*Deputy Director of the United States Patent and Trademark Office*